US011924503B2

United States Patent
Wu et al.

(10) Patent No.: US 11,924,503 B2
(45) Date of Patent: Mar. 5, 2024

(54) BULLET COMMENT PRESENTATION METHOD AND SYSTEM

(71) Applicant: SHANGHAI BILIBILI TECHNOLOGY CO., LTD., Shanghai (CN)

(72) Inventors: Xiuran Wu, Shanghai (CN); Zhaoxin Tan, Shanghai (CN)

(73) Assignee: SHANGHAI BILIBILI TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/778,784

(22) PCT Filed: Mar. 26, 2020

(86) PCT No.: PCT/CN2020/081490
§ 371 (c)(1),
(2) Date: May 20, 2022

(87) PCT Pub. No.: WO2021/103363
PCT Pub. Date: Jun. 3, 2021

(65) Prior Publication Data
US 2022/0408144 A1  Dec. 22, 2022

(30) Foreign Application Priority Data

Nov. 25, 2019 (CN) .......................... 201911166832.X

(51) Int. Cl.
*H04N 21/431* (2011.01)
*H04N 21/488* (2011.01)

(52) U.S. Cl.
CPC ..... *H04N 21/4316* (2013.01); *H04N 21/4884* (2013.01)

(58) Field of Classification Search
CPC .......................... H04N 21/258; H04N 21/431
See application file for complete search history.

(56) References Cited

U.S. PATENT DOCUMENTS

| 10,284,806 B2 | 5/2019 | Cao et al. |
| 2005/0046899 A1 | 3/2005 | Matsuda et al. |

(Continued)

FOREIGN PATENT DOCUMENTS

| CN | 103841121 A | 6/2014 |
| CN | 104967876 A | 10/2015 |

(Continued)

OTHER PUBLICATIONS

International Patent Application No. PCT/CN2020/081490; Int'l Search Report; dated Aug. 14, 2020; 3 pages.

*Primary Examiner* — Samira Monshi
(74) *Attorney, Agent, or Firm* — BakerHostetler

(57) ABSTRACT

The present disclosure describes techniques of presenting bullet comments. The techniques comprise acquiring a page of playing a video; acquiring multiple pieces of original bullet screen data, wherein each piece of original bullet screen data comprises content of a bullet comment and timing information indicating a time of posting the bullet comment in the video; cloning the multiple pieces of original bullet screen data to obtain multiple pieces of bullet screen data corresponding to the plurality of pieces of original bullet comment data; acquiring multiple pieces of target bullet screen data from the multiple pieces of bullet screen data based on the timing information associated with each piece of original bullet comment data; and content comprised in at least one of the plurality of pieces of target bullet comment data in an area of the page configured to display bullet comments.

18 Claims, 7 Drawing Sheets

(56) References Cited

U.S. PATENT DOCUMENTS

2016/0366466 A1    12/2016  Shen et al.
2022/0179665 A1*  6/2022  Rathod ................... G06F 9/451

FOREIGN PATENT DOCUMENTS

| | | |
|---|---|---|
| CN | 106385613 A | 2/2017 |
| CN | 106454485 A | 2/2017 |
| CN | 107087236 A | 8/2017 |
| CN | 108696766 A | 10/2018 |
| CN | 108696767 A | 10/2018 |
| CN | 109379604 A | 2/2019 |
| CN | 110290414 A | 9/2019 |
| CN | 110392293 A | 10/2019 |
| WO | WO 2019/051837 A1 | 3/2019 |

* cited by examiner

BULLET COMMENT PRESENTATION METHOD AND SYSTEM

The present application is the U.S. National Stage of International Application No. PCT/CN2020/081490, filed on Mar. 26, 2020, which claims priority of the Chinese Patent Application No. 201911166832.X, filed on Nov. 25, 2019, and entitled "Bullet comment presentation method and system", both of which are incorporated herein by reference in their entireties.

TECHNICAL FIELD

Embodiments of the present application relate to the field of communications, and in particular to a bullet comment presentation method and system, a computer device, and a computer-readable storage medium.

BACKGROUND

Bullet comments refer to comments in the form of words, emojis, patterns, etc. presented simultaneously when a video is played. At present, bullet comments have become an important element for many viewers to watch videos and live broadcasts. Bullet comments enable users to express their feelings when watching programs, and read comments on the programs from other users as well, thus implementing interaction when the users watch videos. However, the inventor has appreciated that current bullet comments may be displayed poorly due to the potential influence of a network environment.

SUMMARY

In view of this, an objective of embodiments of the present application is to provide a bullet comment presentation method and system, a computer device, and a computer-readable storage medium, so as to solve the problem that current bullet comments may be displayed poorly due to the potential influence of a network environment.

An aspect of the embodiments of the present application provides a bullet comment presentation method, the method including: obtaining a video playing page; obtaining a plurality of pieces of original bullet comment data, each piece of original bullet comment data including bullet comment content and bullet comment posting time; cloning the plurality of pieces of original bullet comment data to obtain a plurality of pieces of bullet comment data; obtaining a plurality of pieces of target bullet comment data from the plurality of pieces of bullet comment data according to bullet comment posting time of each piece of bullet comment data; and presenting at least one piece of bullet comment content in the plurality of pieces of target bullet comment data in a bullet comment displaying area of the video playing page.

Optionally, the obtaining a plurality of pieces of target bullet comment data from the plurality of pieces of bullet comment data according to bullet comment posting time of each piece of bullet comment data includes: obtaining an amount of bullet comment data matching current time on a bullet comment timeline through traversing the plurality of pieces of bullet comment data by a bullet comment calculator; and determining the amount of bullet comment data as the plurality of pieces of target bullet comment data.

Optionally, the bullet comment timeline and the bullet comment calculator work concurrently in a recursively called frame rendering mode.

Optionally, the bullet comment displaying area includes a plurality of bullet comment tracks; and the presenting at least one piece of bullet comment content in the plurality of pieces of target bullet comment data in the bullet comment displaying area includes: adding the plurality of pieces of target bullet comment data to a queue of bullet comments to be posted; and determining a current state of each bullet comment track according to a virtual bullet comment track, the virtual bullet comment track being a pre-configured nested array, the nested array including a plurality of sub-arrays, and each subarray being mapped to one of the plurality of bullet comment tracks; and determining, according to the current state of each bullet comment track, whether to post at least one piece of target bullet comment data in the queue of bullet comments to be posted to present at least one piece of bullet comment content in the at least one piece of target bullet comment data in the bullet comment displaying area.

Optionally, the determining a current state of each bullet comment track according to a virtual bullet comment track includes: S1: determining whether an $i^{th}$ subarray is empty, the $i^{th}$ subarray corresponding to an $i^{th}$ bullet comment track; and S2: determining, if the $i^{th}$ subarray is empty, that a current state of the $i^{th}$ bullet comment track is an idle state.

Optionally, the determining a current state of each bullet comment track according to a virtual bullet comment track further includes: S3: determining, if the $i^{th}$ subarray is not empty, whether queue head bullet comment content in queue head bullet comment data to be posted in the queue of bullet comments to be posted and tail bullet comment content in the posted tail bullet comment data may collide, the queue head bullet comment data to be posted being target bullet comment data located at the head of the queue of bullet comments to be posted and the posted tail bullet comment data being posted bullet comment data located at the tail of the $i^{th}$ array; and S4: determining, if the queue head bullet comment content in the queue head bullet comment data to be posted and the tail bullet comment content in the posted tail bullet comment data may not collide, that the current state of the $i^{th}$ bullet comment track is the idle state.

Optionally, the determining whether queue head bullet comment content in queue head bullet comment data to be posted in the queue of bullet comments to be posted and tail bullet comment content in the posted tail bullet comment data may collide includes: calculating presentation time $t_1+t_2$ of the tail bullet comment content in the posted tail bullet comment data in the bullet comment displaying area according to posting time $t_1$ and moving time $t_2$ in the posted tail bullet comment data; calculating arrival time $t_3+[w_1 * t_4/[w_1+w_2)]$ when the queue head bullet comment content in the queue head bullet comment data to be posted reaches a left boundary of the bullet comment displaying area according to posting time $t_3$, moving time $t_4$, and a bullet comment width $w_2$ of the queue head bullet comment data to be posted, and a displaying width $w_1$ of the bullet comment displaying area; determining whether the presentation time $t_1+t_2$ is earlier than the arrival time $t_3+[w_1 * t_4/[w_1+w_2)]$; and determining, if the presentation time $t_1+t_2$ is earlier than the arrival time $t_3+[w_1 * t_4/[w_1+w_2)]$, that the queue head bullet comment content in the queue head bullet comment data to be posted and the tail bullet comment content in the posted tail bullet comment data may not collide; and determining, if the presentation time $t_1+t_2$ is not earlier than the arrival time $t_3+[w_1 * t_4/[w_1+w_2)]$, that the queue head bullet comment content in the queue head bullet comment data to be posted and the tail bullet comment content in the posted tail bullet comment data may collide.

Optionally, the determining a current state of each bullet comment track according to a virtual bullet comment track further includes: S5: determining, if the queue head bullet comment content in the queue head bullet comment data to be posted and the tail bullet comment content in the posted tail bullet comment data may collide, that the current state of the $i^{th}$ bullet comment track is a crowded state.

Optionally, the determining a current state of each bullet comment track according to a virtual bullet comment track further includes: updating a value of i, and executing steps S1 to S4 on the basis of the updated value of i until i is equal to M, where $1 \leq i \leq M$, an initial value of i is 1, and M represents the number of the plurality of bullet comment tracks.

Optionally, the determining, according to the current state of each bullet comment track, whether to post at least one piece of target bullet comment data in the queue of bullet comments to be posted to present at least one piece of bullet comment content in the at least one piece of target bullet comment data in the bullet comment displaying area includes: deleting the plurality of pieces of target bullet comment data in the queue of bullet comments to be posted if it is determined that the first track to an $M^{th}$ track are all in the crowded state.

Optionally, the determining, according to the current state of each bullet comment track, whether to post at least one piece of target bullet comment data in the queue of bullet comments to be posted to present at least one piece of bullet comment content in the at least one piece of target bullet comment data in the bullet comment displaying area includes: if it is determined that the current state of the $i^{th}$ bullet comment track is the idle state: adding the queue head bullet comment data to be posted in the queue of bullet comments to be posted to the $i^{th}$ array; adding the queue head bullet comment data to be posted in the queue of bullet comments to be posted to the rendering list, so as to render the queue head bullet comment content corresponding to the queue head bullet comment data to be posted and then present the rendered queue head bullet comment content on the $i^{th}$ bullet comment track in the bullet comment displaying area; and updating the queue head bullet comment data to be posted in the queue of bullet comments to be posted.

An aspect of the embodiments of the present application further provides a bullet comment presentation system, the bullet comment presentation system including: a first obtaining module configured to obtain a video playing page, the video playing page including a bullet comment displaying area for presenting video streams; a second obtaining module configured to obtain a plurality of pieces of original bullet comment data, each piece of original bullet comment data including bullet comment content and bullet comment posting time; a cloning module configured to clone the plurality of pieces of original bullet comment data to obtain a plurality of pieces of bullet comment data; a third obtaining module configured to obtain a plurality of pieces of target bullet comment data from the plurality of pieces of bullet comment data according to bullet comment posting time of each piece of bullet comment data; and a presentation module configured to present at least one piece of bullet comment content in the plurality of pieces of target bullet comment data in a bullet comment displaying area of the video playing page.

An aspect of the embodiments of the present application further provides a computer device, the computer device including a memory, a processor, and computer-readable instructions stored on the memory and executable on the processor, where when executing the computer-readable instructions, the processor implements the following steps: obtaining a video playing page; obtaining a plurality of pieces of original bullet comment data, each piece of original bullet comment data including bullet comment content and bullet comment posting time; cloning the plurality of pieces of original bullet comment data to obtain a plurality of pieces of bullet comment data; obtaining a plurality of pieces of target bullet comment data from the plurality of pieces of bullet comment data according to bullet comment posting time of each piece of bullet comment data; and presenting at least one piece of bullet comment content in the plurality of pieces of target bullet comment data in a bullet comment displaying area of the video playing page.

An aspect of the embodiments of the present application further provides a computer-readable storage medium having stored therein computer-readable instructions, where the computer-readable instructions can be executed by at least one processor, so as to implement the following steps: obtaining a video playing page; obtaining a plurality of pieces of original bullet comment data, each piece of original bullet comment data including bullet comment content and bullet comment posting time; cloning the plurality of pieces of original bullet comment data to obtain a plurality of pieces of bullet comment data; obtaining a plurality of pieces of target bullet comment data from the plurality of pieces of bullet comment data according to bullet comment posting time of each piece of bullet comment data; and presenting at least one piece of bullet comment content in the plurality of pieces of target bullet comment data in a bullet comment displaying area of the video playing page.

According to the bullet comment presentation method, system, device, and computer-readable storage medium provided by embodiments of the present application, after the plurality of pieces of original bullet comment data are obtained, the plurality of pieces of original bullet comment data are taken as original data; the plurality of pieces of original bullet comment data are cloned to obtain the plurality of pieces of bullet comment data corresponding to the cloning operation, the plurality of pieces of bullet comment data corresponding to the cloning operation are used for a bullet comment display operation; and when a playing progress bar is dragged back to a previous playing time node, the plurality of pieces of original bullet comment data as the original data are cloned to obtain a plurality of pieces of bullet comment data corresponding to the re-cloning operation, and the plurality of pieces of bullet comment data corresponding to the re-cloning operation are used for a bullet comment display operation. Therefore, each time the playing progress bar is dragged back to the previous playing time node, a cloning operation can be performed again instead of requesting downloading again, thus improving the efficiency of bullet comment displaying.

DETAILED DESCRIPTION OF EMBODIMENTS

In order to make the objectives, technical solutions, and advantages of the present application clearer, the present application will be described in further detail below in conjunction with the accompanying drawings and embodiments. It should be understood that the specific embodiments described here are merely intended to explain the present application, but are not intended to limit the present application. All other embodiments obtained by those of ordinary skill in the art based on the embodiments of the present application without creative efforts shall fall within the scope of protection of the present application.

Figure 1:
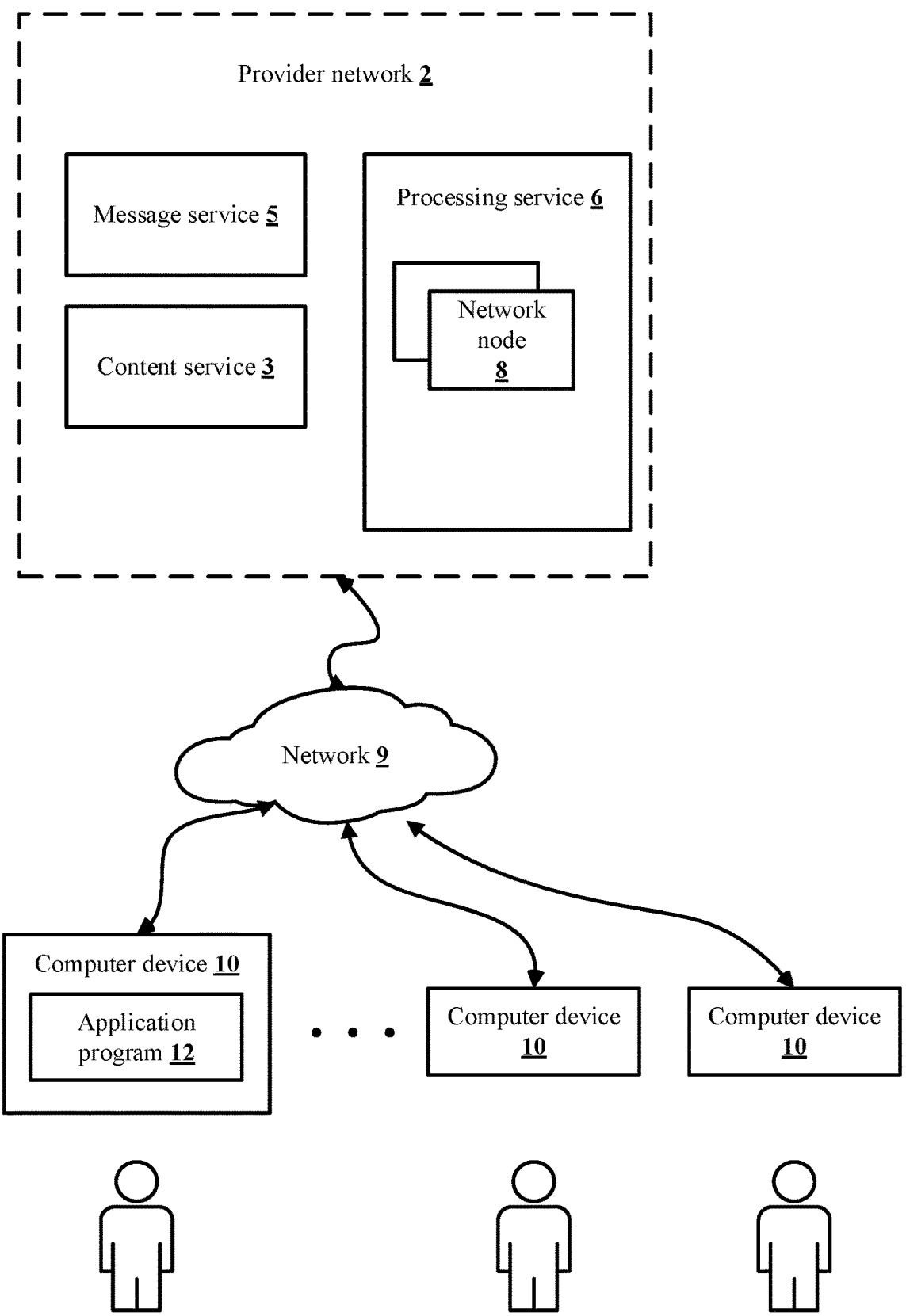
FIG. 1 is a diagram schematically showing an application environment of a bullet comment presentation method according to an embodiment of the present application.

FIG. 1 is a schematic diagram schematically showing an environment application of a bullet comment presentation method according to an embodiment of the present application.

A provider network 2 may be connected to a plurality of computer devices 10 through a network 9. In some embodiments, a content service 3 is provided by the provider network 2. In other embodiments, the content service 3 may be provided by an independent content provider connected to the provider network 2.

The content service 3 may include a content streaming service such as an Internet protocol video streaming service. The content streaming service may be configured to distribute content by using various transmission technologies. The content service 3 may be configured to provide content such as videos, audio, text data, and a combination thereof. The content may include content streams (for example, video streams, audio streams, and information streams), content files (for example, video files, audio files, and text files), and/or other data.

The provider network 2 may implement a bullet comment service. The bullet comment service is configured to allow a user to make comments and/or share comments associated with content. Bullet comment content may be presented on the same screen together with the content. For example, the bullet comment content may be displayed in an overlay image above the content. The bullet comment content may be displayed with an animation effect. For example, the bullet comment content may be displayed as the content scrolling (for example, from right to left, from left to right, from top to bottom, and from bottom to top), and the animation effect may be implemented on the basis of transition attributes of cascading style sheets (CSS3).

The provider network 2 may be located in a data center, for example, on a single site, or distributed at different geographical positions (for example, on a plurality of sites). The provider network 2 may provide services via one or more networks 9. The network 9 includes various network devices, for example, routers, switches, multiplexers, hubs, modems, network bridges, repeaters, firewalls, proxy devices, and/or the like. The network 9 may include physical links, for example, coaxial cable links, twisted pair cable links, optical fiber links, and a combination thereof. The network 9 may include wireless links, for example, cellular links, satellite links, and Wi-Fi links.

The provider network 2 may include a message service 5. The message service 5 may be configured to receive a plurality of messages. The plurality of messages may include a plurality of pieces of bullet comment content associated with the content and information related to the plurality of pieces of bullet comment content.

The message service 5 may be configured to manage messages used for various content items. The user may browse the content and access different content items to view comments on specific content, for example, comments posted by other users on the specific content. A comment, associated with a specific content item, from a user, may be output to other users viewing the specific content item. For example, all users accessing a content item (for example, a video clip) may view comments associated with the content item. The input bullet comment content may be output in real time or almost in real time.

The message service 5 may be configured to process the plurality of messages. The message service 5 may queue the plurality of messages or prioritize them in other manners on the basis of information (for example, timestamps and incremental identifiers) associated with the corresponding bullet comment content. The message service 5 may be configured to process the plurality of messages through load balancing. For example, the message service 5 may be configured to use one or more of a plurality of processing nodes to process the plurality of messages, prioritize the messages, and perform load balancing on the messages. The message service 5 may at least temporarily store the plurality of messages. The message service 5 may store the plurality of messages in a data store such as a database.

The message service 5 may be configured to process the messages by performing a grouping process. The grouping process may include grouping of the plurality of messages on the basis of features. If two messages have the same features or fall within a threshold range of features, the two messages may be grouped together. Messages associated with the specific content item (for example, a stream, a file, a program, a movie, a song, and a game session) may be associated with the same group. For example, a message may include or be associated with a content identifier. The content identifier may uniquely identify a content item. If the content identifier is found in a message or is associated with a message (for example, is sent separately), the message service 5 may associate the message with a group associated with the content item.

The message service 5 may perform natural language processing, topic identification, pattern identification, artificial intelligence, etc. to automatically determine a feature of a message and/or group the message. As an example, a phrase or a pattern which frequently appears may be identified as a topic. As another example, a database of a topic associated with content may be maintained. The topic may include a genre (for example, an action, a drama, and a comedy), a personality (for example, an actor, an actress, and a director), a language, etc. Messages may be grouped on the basis of a feature of a client device and/or a user sending the messages. Demography, interest, history, and/or the like may be stored for a plurality of users to determine potential groups of messages.

The message service 5 may be further configured to process the messages by generating output data. The output data may include an instruction for outputting a comment on the basis of corresponding context. The output data may include application data for applying an overlay comment on the basis of an indication of the context. The output data may include an instruction for generating (for example, encoding) content corresponding to a comment.

The output data may be used to generate (for example, encode) output bullet comment content, for example, output content streams. The output comment content may be combined (for example, multiplexing) with an original content item, for example, content provided by the content service 3. An obtained combination may include content in a single package (for example, a container, a transport container, and a transport stream). The package may include the original content item and the output bullet comment content (which is, for example, displayed on the top of the original content item).

The message service 5 may be further configured to process the messages by performing a screening process. The screening process may include rejecting or marking a message matching a screening criterion. The screening criterion may specify a term and/or a phrase, for example, profanity, a hate comment, and an indecent comment. The screening criterion may specify a character, for example, a symbol or a font. The screening criterion may specify a language, a computer-readable code mode, etc.

The provider network 2 may further include a processing service 6. The processing service 6 may be configured to provide processing for various services, for example, a service of the provider network 2. The processing service 6 may include a plurality of network nodes 8. The plurality of network nodes 8 may process a task associated with the message service 5. The plurality of network nodes 8 may be implemented as one or more computing devices, one or more processors, one or more virtual computing instances, a combination thereof, and/or the like.

The plurality of network nodes 8 may be implemented by one or more computing devices. The one or more computing devices may include a virtualized computing instance. The virtualized computing instance may include a virtual machine, for example, a simulation of a computer system, an operating system, and a server. The computing device may load a virtual machine on the basis of a virtual image and/or other data that defines specific software (for example, an operating system, a specific application program, and a server) for simulation. As the requirements on different types of processing services change, different virtual machines may be loaded and/or terminated on the one or more computing devices. A hypervisor may be implemented to manage use of different virtual machines on the same computing device.

In some embodiments, the plurality of network nodes 8 may process events submitted by a plurality of computer devices. These events may be associated with discussions on real-time news, videos, social hotspots, reports on some user accounts, etc. In other embodiments, the plurality of network nodes 8 may process performance evaluation of a plurality of user accounts for reviewing events in a network community. In some implementations, these services may be implemented as dedicated computing devices, dedicated processors, dedicated virtual machine instances, and/or the like. In other implementations, various nodes may implement any function associated with these services.

The plurality of computer devices 10 may be configured to access content and a service of the provider network 2. The plurality of computer devices 10 may include any type of electronic devices, for example, mobile devices, tablet devices, laptop computers, workstations, virtual reality devices, game devices, set-top boxes, digital streaming media devices, vehicle terminals, smart televisions, set-top boxes, and e-book readers.

The plurality of computer devices 10 may be associated with one or more users. A single user may access the provider network 2 using one or more of the plurality of computer devices 10. The plurality of computer devices 10 may travel to various positions and use different networks to access the provider network 2.

The computer device 10 may include an application program 12. The application program 12 outputs (for example, displays, renders, or presents) content to a user. The application program 12 may be a video client (for example, a bilibili client), a browser client, a WeChat mini program based on WeChat, etc. The content may include a video, audio, a bullet comment content, and/or the like. The bullet comment content may be words, expressions, patterns, etc., and may have different colors, sizes, animations, scrolling directions, etc.

As an example, the application program 12 may send reports on some users to the processing service, and the application program 12 may also send comments on the reports to the processing service 6. Events or comments sent from the plurality of computer devices 10 include reasons for submitting the events, content attributes associated with the events, user account information, etc.

Embodiment 1

Figure 2:
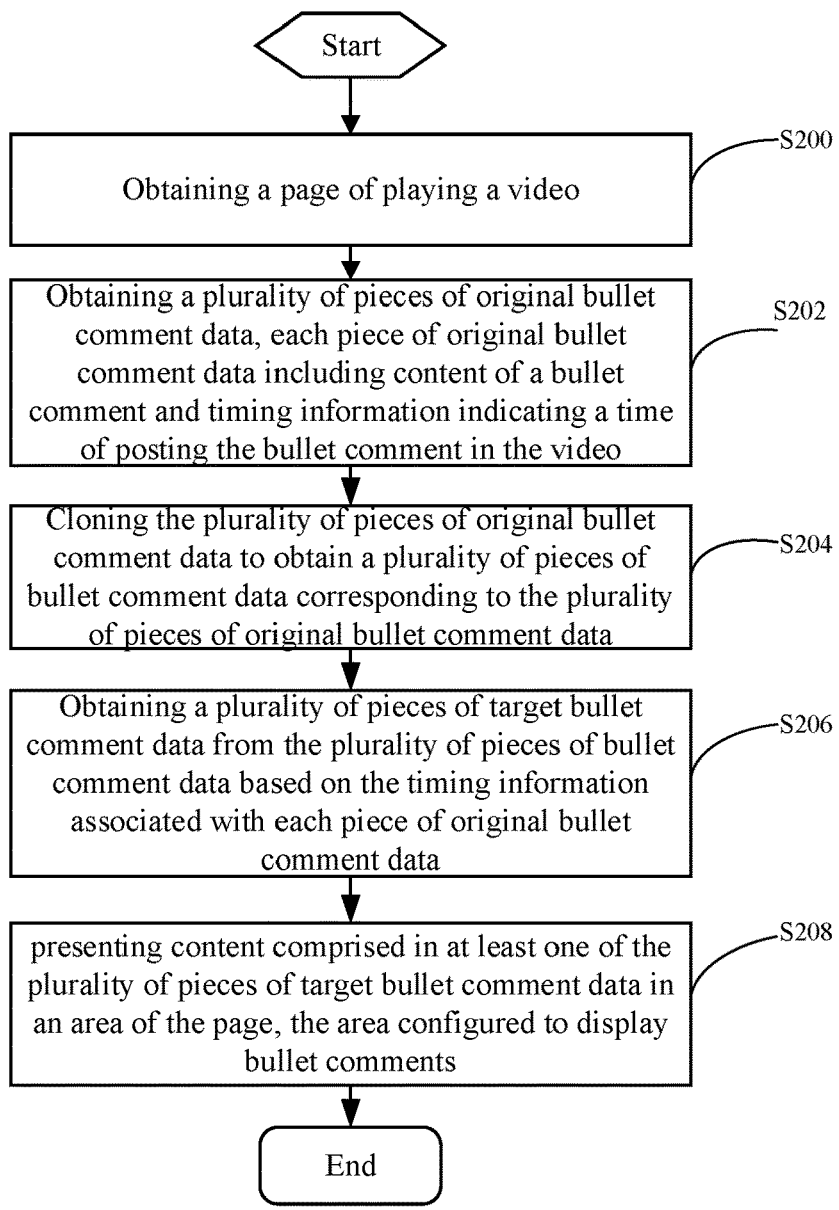
FIG. 2 is a flowchart schematically showing a bullet comment presentation method according to Embodiment 1 of the present application.

FIG. 2 is a flowchart schematically showing a bullet comment presentation method according to Embodiment 1 of the present application. It can be understood that this method embodiment may be executed in a computer device 10, and the flowchart of this method embodiment is not used to limit an order of executing steps.

As shown in FIG. 2, the bullet comment presentation method may include steps S200 to S208, where:

In step S200, a page of playing a video is obtained.

In step S202, a plurality of pieces of original bullet comment data are obtained, each piece of original bullet comment data including bullet content of a bullet comment and timing information indicating a time of posting the bullet comment in the video.

In step S204, the plurality of pieces of original bullet comment data are cloned to obtain a plurality of pieces of bullet comment data, the plurality of pieces of bullet comment data corresponding to the plurality of pieces of original bullet comment data.

In step S206, a plurality of pieces of target bullet comment data are obtained from the plurality of pieces of bullet comment data based on the timing information associated with each piece of original bullet comment data.

In step S208, content comprised in at least one of the plurality of pieces of target bullet comment data is presented in an area of the page of playing the video, the area is configured to display bullet comments.

In order to make the present application clearer and more understandable, a specific example is provided below. It should be noted that this example is not used to limit the present application.

① The computer device 10 initiates a request for original bullet comment data to the provider network 2.

② The computer device 10 receives an Extensible Markup Language (XML) file returned by the provider network 2 in response to the page access request.

③ The XML file is compiled to obtain a plurality of pieces of original bullet comment data.

Specifically, the XML file is compiled into an Element object, a plurality of pieces of original bullet comment data, for example, attributes (original bullet comment data) such as bullet comment content, posting time, a bullet comment color, and moving time are obtained from the Element object, and these attributes are converted into a json data format and stored in a local array, to obtain the plurality of pieces of original bullet comment data stored in the local array. The plurality of pieces of original bullet comment data may be obtained through a plurality of pushes of the provider network, and the plurality of pieces of original bullet comment data include historical original bullet comment data and real-time original bullet comment data.

④ The computer device 10 clones the plurality of pieces of original bullet comment data to obtain a plurality of pieces of bullet comment data.

In the process of screening and using a bullet comment, a state of the bullet comment may change. When a playing progress bar is dragged back to a previous playing time node, the bullet comment data may no longer be usable due to the change of the state, and consequently it is often required to request downloading again from the provider network 2.

The cloning operation has the following advantages: after the plurality of pieces of original bullet comment data are obtained, the plurality of pieces of original bullet comment data are taken as original data; the plurality of pieces of original bullet comment data are cloned to obtain a plurality of pieces of bullet comment data corresponding to the first cloning operation, the plurality of pieces of bullet comment data corresponding to the first cloning operation are used for a bullet comment display operation; and when a playing progress bar is dragged back to a previous playing time node, the plurality of pieces of original bullet comment data as the original data are cloned to obtain a plurality of pieces of bullet comment data corresponding to the second cloning operation, and the plurality of pieces of bullet comment data corresponding to the second cloning operation are used for a bullet comment display operation. It is not difficult to understand that, in this embodiment, each time the playing progress bar is dragged back to the previous playing time node, a cloning operation can be performed again instead of requesting downloading again from the provider network 2.

⑤ The computer device 10 obtains a plurality of pieces of target bullet comment data from the plurality of pieces of bullet comment data according to bullet comment posting time of each piece of bullet comment data.

The bullet comment calculator and bullet comment timeline are located at a logical layer of the application program 12 (such as a browser and a WeChat mini program), and the bullet comment timeline and the bullet comment calculator may work concurrently in a recursively called frame rendering mode through the logical layer.

Figure 3:
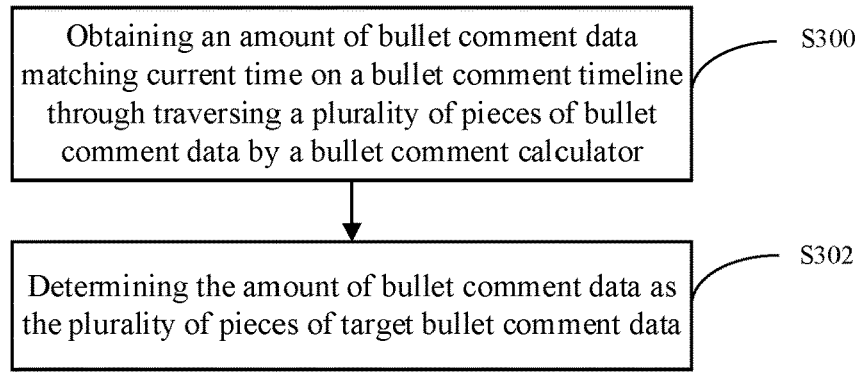
FIG. 3 is a flowchart schematically showing step S206 in FIG. 2.

In an exemplary embodiment, as shown in FIG. 3, step S206 further includes steps S300 to S302: In step S300, an amount of bullet comment data matching current time on a bullet comment timeline is obtained through traversing the plurality of pieces of bullet comment data by a bullet comment calculator. In step S302, the amount of bullet comment data is determined as the plurality of pieces of target bullet comment data. Specifically, the bullet comment calculator performs traversal and screening on the plurality of pieces of bullet comment data, an amount of bullet comment data meeting the posting time will be added backwards to a queue of bullet comments to be posted, and at the same time, the amount of bullet comment data added to the queue of bullet comments to be posted may be deleted from the plurality of pieces of bullet comment data to reduce the number of subsequent traversals.

When the bullet comment calculator detects that posting of the plurality of pieces of cloned bullet comment data is completed, the bullet comment calculator and the bullet comment timeline stop running and a bullet comment system is reset. In addition, if the computer device 10 detects that a user clicks a pause button or video playing is completed, the bullet comment calculator and the bullet comment timeline may pause or stop running at the same time.

⑥ The computer device 10 presents at least one piece of bullet comment content in the plurality of pieces of target bullet comment data in a bullet comment displaying area of the video playing page.

After screening out the plurality of pieces of target bullet comment data, the computer device 10 traverses to find out whether there is a bullet comment track in an idle state in the bullet comment displaying area. If all the bullet comment tracks are not in the idle state at present, the plurality of pieces of target bullet comment data in the queue of bullet comments to be posted are discarded. If one or more bullet comment tracks are in the idle state, one or more pieces of target bullet comment data in the queue of bullet comments to be posted are added backwards to a rendering list, and the transition attributes of CSS3 are used as a motion animation of each piece of bullet comment content, and data of a view layer is updated to notify the view layer to perform rendering and update.

The WeChat mini program is taken as an example: a rendering process and a displaying process are functions of encapsulating of a WeChat mini program framework according to a model-view-controller (MVC) mode idea, and rendering is completed by the WeChat mini program framework. The following piece of bullet comment data is taken as an example:

```
[
  {
    Color: '#fff',
    Text: 'I am text content of a bullet comment ',
    Style: 'transform: translate(-100%, 0); transition: .6s all lienar;'
  }
]
```

This piece of bullet comment data is bound to elements in a WeiXinMarkup Language (WXML) file. At present, when the WeChat mini program is notified by a setData API to update the view according to the data, the WeChat mini program may obtain, through rendering according to this piece of bullet comment data, bullet comment content which is "I am text content of a bullet comment" with a white font color, and with a movement manner of performing linear movement from the origin to 100% of its width and a movement time of 0.6 s. This animation effect may be achieved on the basis of the transition attributes of CSS3.

Embodiment 2

Figure 4:
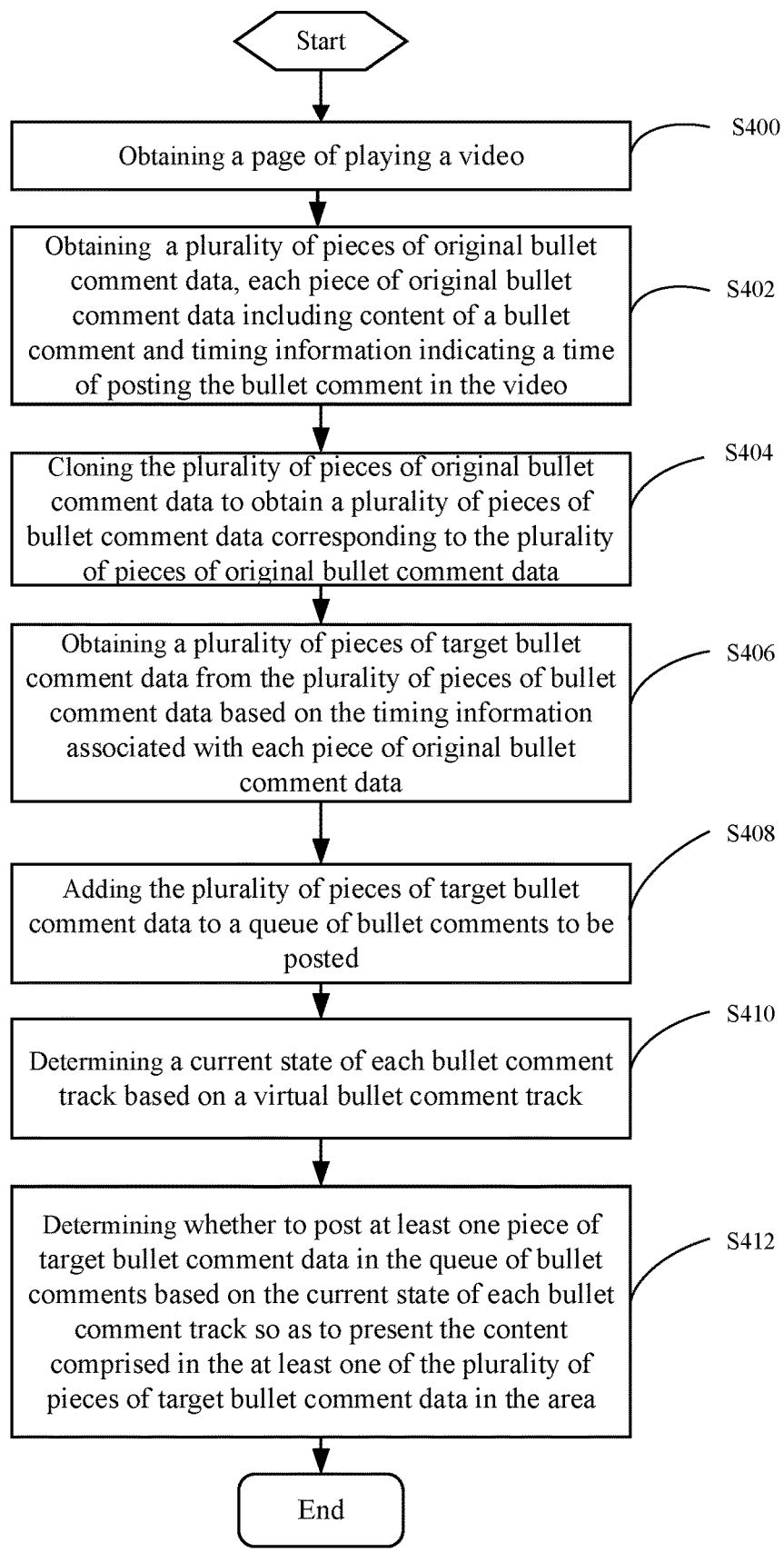
FIG. 4 is a flowchart schematically showing a bullet comment presentation method according to Embodiment 2 of the present application.

FIG. 4 is a flowchart schematically showing a bullet comment presentation method according to Embodiment 2 of the present application. The bullet comment presentation method may include steps S400 to S412, where:

In step S400, a page of playing a video is obtained.

In step S402, a plurality of pieces of original bullet comment data are obtained, each piece of original bullet comment data including content of a bullet comment and timing information indicating a time of posting the bullet comment in the video.

For example, the original bullet comment data may include the following information:

```
{
    stime,      //  Time of posting in a video in units of second
    mode,       // Mode of a bullet comment
    size,       // Size of bullet comment text
    color,      //Color of bullet comment text
    date,       // Creation date of a bullet comment
    class,      // Class name of a bullet comment
  uid,          // id of a user that creates a bullet comment
  dmid,         // Bullet comment id
    text,       // Text content of a bullet comment
    duration,   // Duration of a bullet comment
    border,     // Whether a bullet comment has a border
  borderColor,  // Color of a bullet comment border
    style,      // Interline style of bullet comments
}
```

In step S404, the plurality of pieces of original bullet comment data are cloned to obtain a plurality of pieces of bullet comment data corresponding to the plurality of pieces of original bullet comment data.

In step S406, a plurality of pieces of target bullet comment data are obtained from the plurality of pieces of bullet comment data based on the timing information associated with each piece of original bullet comment data.

In step S408, the plurality of pieces of target bullet comment data are added to a queue of bullet comments to be posted.

A computer device 10 performs a data update operation on the view layer, and performs the first rendering operation according to the bullet comment data in a to-be-posted state.

For example, real bullet comment elements are inserted outside a view area, which is invisible to a user, and no motion effects are added. Such an operation aims at obtaining a real bullet comment width of the bullet comment element so as to calculate a start motion position and an end motion position of bullet comment content, and to be used as one of bases for determining whether there is a bullet comment track in an idle state in a plurality of bullet comment tracks.

In order to reduce the number of subsequent traversals, the method may further include the following step: updating the plurality of pieces of bullet comment data to delete the plurality of pieces of target bullet comment data from the plurality of pieces of bullet comment data. That is, after each piece of target bullet comment data is added to the queue of bullet comments to be posted, this piece of target bullet comment data will be deleted from the plurality of pieces of bullet comment data.

In step S410, a current state of each bullet comment track is determined based on a virtual bullet comment track.

The bullet comment displaying area includes a plurality of bullet comment tracks. The virtual bullet comment track is a pre-configured nested array, the nested array includes a plurality of subarrays, and each subarray is mapped to one of the plurality of bullet comment tracks.

The so-called virtual bullet comment track is put forward to achieve a good bullet comment visual effect, and each piece of bullet comment content may not be blocked by other bullet comment content, which needs to realize that bullet comment content does not overlap with each other. The virtual bullet comment track substantially simulates a relation between bullet comment content and a bullet comment track in a data format of array nested array. The bullet comment data in the virtual bullet comment track does not participate in rendering of the view layer, but maps the current relation between bullet comment content and a bullet comment track in the form of data. A working principle of the virtual bullet comment track is to push backwards the same number of array objects into an array object on the basis of the number of bullet comment tracks configured when the bullet comment system is initialized, which is similar to the form of [[ ], [ ], [ ], [ ], . . . ]. Each subarray in the nested array represents one bullet comment track.

Figure 5:
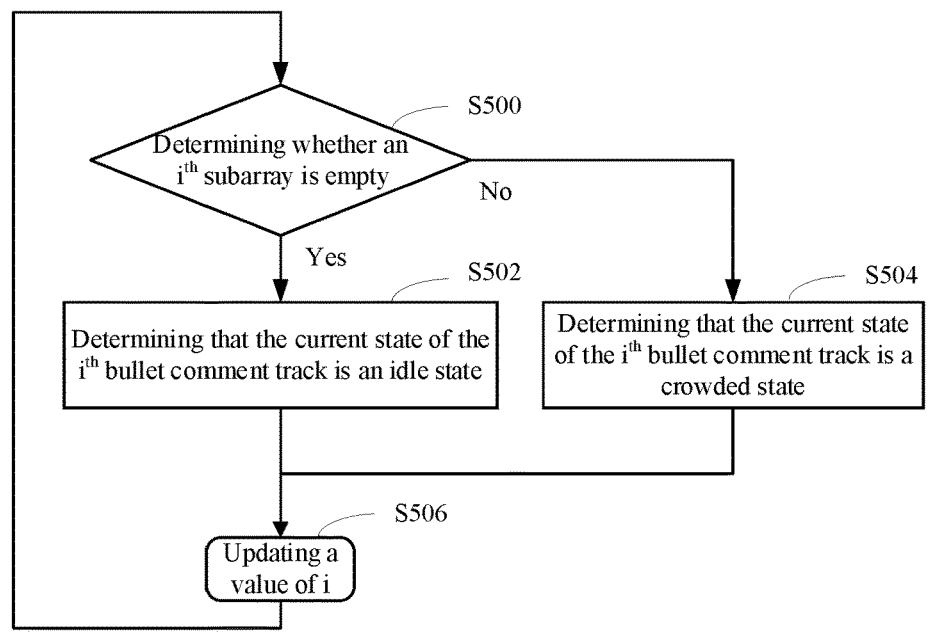
FIG. 5 is a flowchart schematically showing step S410 in FIG. 4.

To ensure that bullet comment content does not overlap with each other, the following determination mechanisms are provided:

The determination mechanism 1 is shown in FIG. 5, where step S410 may include steps S500 to S506:

In step S500, whether an $i^{th}$ subarray is empty is determined, the $i^{th}$ subarray corresponding to an $i^{th}$ bullet comment track. If the $i^{th}$ subarray is empty, the process proceeds to step S502, otherwise, the process proceeds to step S504.

In step S502, it is determined that the current state of the $i^{th}$ bullet comment track is an idle state.

In step S504, it is determined that the current state of the $i^{th}$ bullet comment track is a crowded state.

In step S506, a value of i is updated, and steps S500 to S506 are executed on the basis of the updated value of i until i is equal to M, where $1 \leq i \leq M$, an initial value of i is 1, and M represents the number of the plurality of bullet comment tracks.

Figure 6:
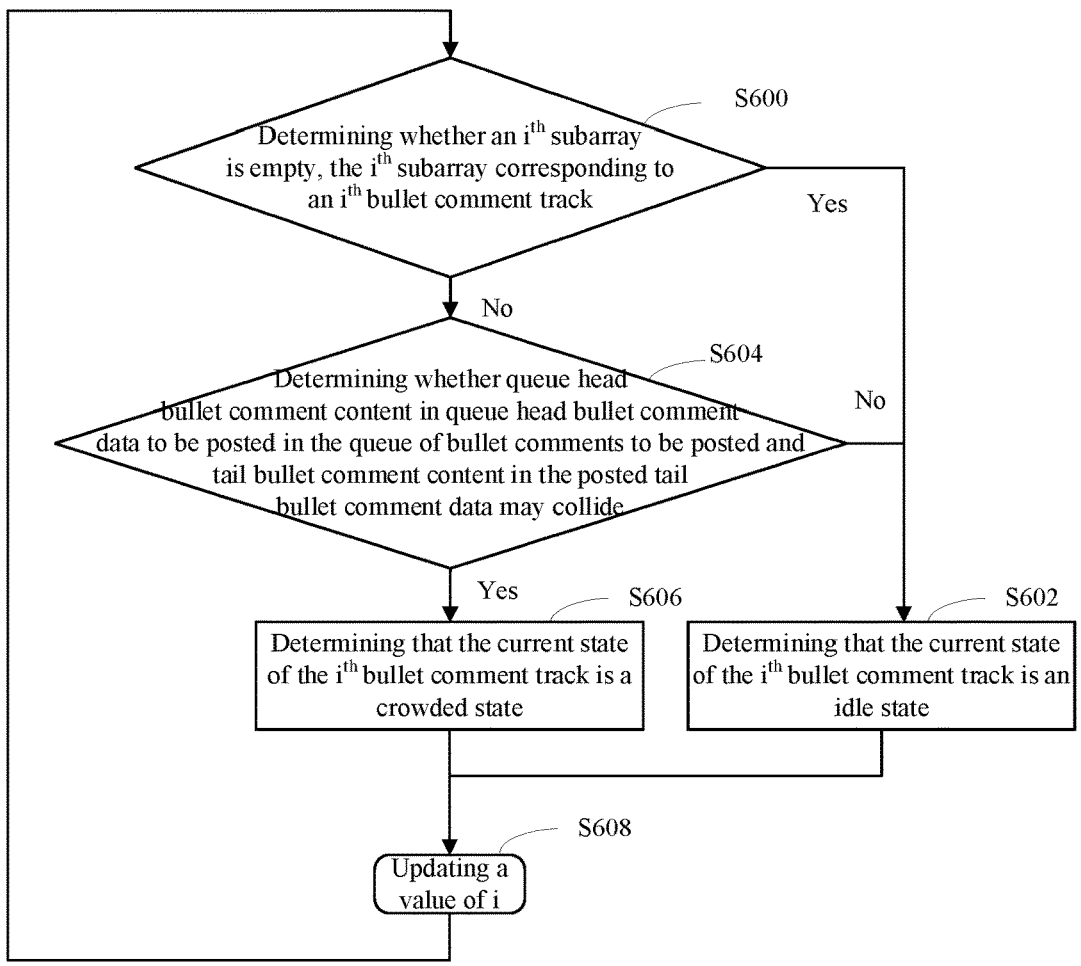
FIG. 6 is another flowchart schematically showing step S410 in FIG. 4.

The determination mechanism 2 is shown in FIG. 6, where step S410 may include steps S600 to S608:

In step S600, whether an $i^{th}$ subarray is empty is determined, the $i^{th}$ subarray corresponding to an $i^{th}$ bullet comment track. If the $i^{th}$ subarray is empty, the process proceeds to step S602, otherwise, which indicates that a moving bullet comment content already exists on the $i^{th}$ bullet comment track, the process proceeds to step S604.

In step S602, it is determined that the current state of the $i^{th}$ bullet comment track is an idle state.

In step S604, whether queue head bullet comment content in queue head bullet comment data to be posted in the queue of bullet comments to be posted and tail bullet comment content in the posted tail bullet comment data may collide is determined. If the two may not collide, the process proceeds to step S602, otherwise, the process proceeds to step S606.

It should be noted the queue head bullet comment data to be posted is target bullet comment data located at the head of the queue of bullet comments to be posted. The posted tail bullet comment data is posted bullet comment data located at the tail of the $i^{th}$ array, the posted tail bullet comment data corresponds to the last bullet comment data in the $i^{th}$ array, and the tail bullet comment content corresponds to the latest posted bullet comment content presented in the $i^{th}$ bullet comment track.

Figure 7:
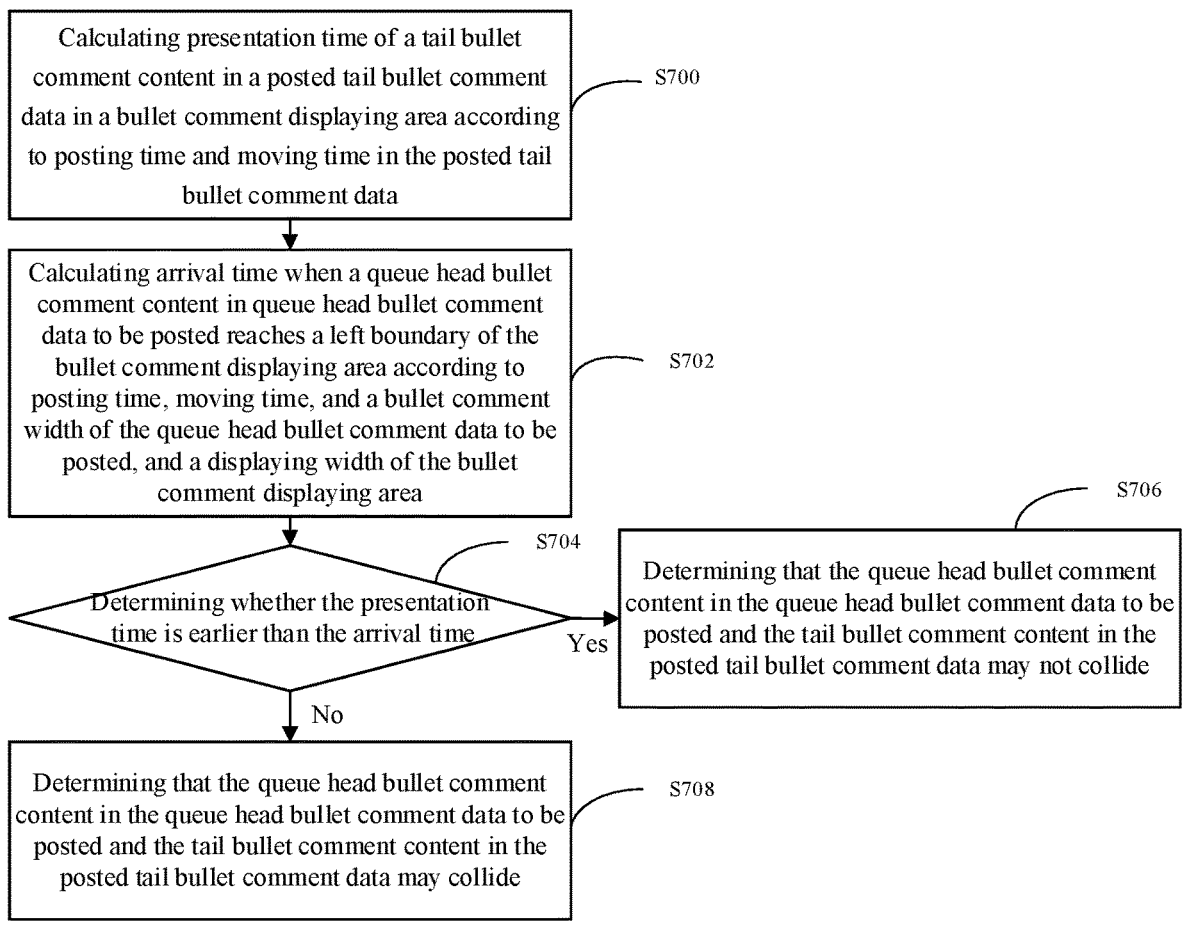
FIG. 7 is a flowchart schematically showing step S604 in FIG. 6.

In an exemplary embodiment, as shown in FIG. 7, step S604 may be implemented through steps S700 to S708, where: In step S700, presentation time $t_1+t_2$ of the tail bullet comment content in the posted tail bullet comment data in the bullet comment displaying area is calculated according to posting time $t_1$ and moving time $t_2$ in the posted tail bullet comment data. In step S702, arrival time $t_3+[w_1*t_4/[w_1+w_2)]$ when the queue head bullet comment content in the queue head bullet comment data to be posted reaches a left boundary (or other boundaries depending on a moving end position) of the bullet comment displaying area is calculated according to posting time $t_3$, moving time $t_4$, and a bullet comment width $w_2$ of the queue head bullet comment data to be posted, and a displaying width $w_1$ of the bullet comment displaying area. In step S704, whether the presentation time $t_1+t_2$ is earlier than the arrival time $t_3+[w_1*t_4/[w_1+w_2)]$ is determined, and if the presentation time $t_1+t_2$ is earlier than the arrival time $t_3+[w_1*t_4/[w_1+w_2)]$, the process proceeds to step S706, otherwise, the process proceeds to step S708. In step S706, it is determined that the queue head bullet comment content in the queue head bullet comment data to be posted and the tail bullet comment content in the posted tail bullet comment data may not collide. In step S708, it is determined that the queue head bullet comment content in the queue head bullet comment data to be posted and the tail bullet comment content in the posted tail bullet comment data may collide.

It is not difficult to understand that it is assumed that posting time and moving time of the last piece of bullet comment content in the $i^{th}$ bullet comment track is $t_1$ and $t_2$ respectively, then time when the last piece of bullet comment content completely disappears from the bullet comment displaying area (the view area) is $t_1+t_2$, and it is assumed that the posting time, the moving time, and the bullet comment width of the queue head bullet comment data to be posted and the displaying width of the bullet comment displaying area are $t_3$, $t_4$, $w_2$, and $w_1$ respectively, then a moving speed of the queue head bullet comment content in the queue head bullet comment data to be posted is $s_1=(w_1+w_2)/t_4$. Therefore, it may be concluded that time when the queue head bullet comment content in the queue head bullet comment data to be posted reaches the left boundary of the bullet comment displaying area for the first time is $t_3+(w_1/s_1)$. When $t_1+t_2<t_3+(w_1/s_1)$, it indicates that when the last piece of bullet comment content completely disappears from the bullet comment displaying area, the queue head bullet comment content in the queue head bullet comment data to be posted still has not caught up with the last piece of bullet comment content. This means that the last piece of bullet comment content and the queue head bullet comment content in the queue head bullet comment data to be posted will not collide, and therefore, it may be determined that the current state of the $i^{th}$ bullet comment track is the idle state.

In step S606, it is determined that the current state of the $i^{th}$ bullet comment track is a crowded state.

In step S608, a value of i is updated, and steps S600 to S608 are executed on the basis of the updated value of i until i is equal to M, where $1 \le i \le M$, an initial value of i is 1, and M represents the number of the plurality of bullet comment tracks.

In step S412, whether to post at least one piece of target bullet comment data in the queue of bullet comments to be posted is determined based on the current state of each bullet comment track so as to present the content comprised in the at least one of the plurality of pieces of target bullet comment data in the bullet comment displaying area of the video playing page.

The bullet comment displaying area may be a video playing area or other areas.

The bullet comment track may be in the idle state or the crowded state.

If the current state of the $i^{th}$ bullet comment track is the idle state, at least one piece of target bullet comment data in the queue of bullet comments to be posted is determined to be posted, so as to present at least one piece of bullet comment content in the at least one piece of target bullet comment data in the bullet comment displaying area.

If the current state of the $i^{th}$ bullet comment track is the crowded state, at least one piece of target bullet comment data in the queue of bullet comments to be posted is determined not to be posted.

Example 1

Figure 8:
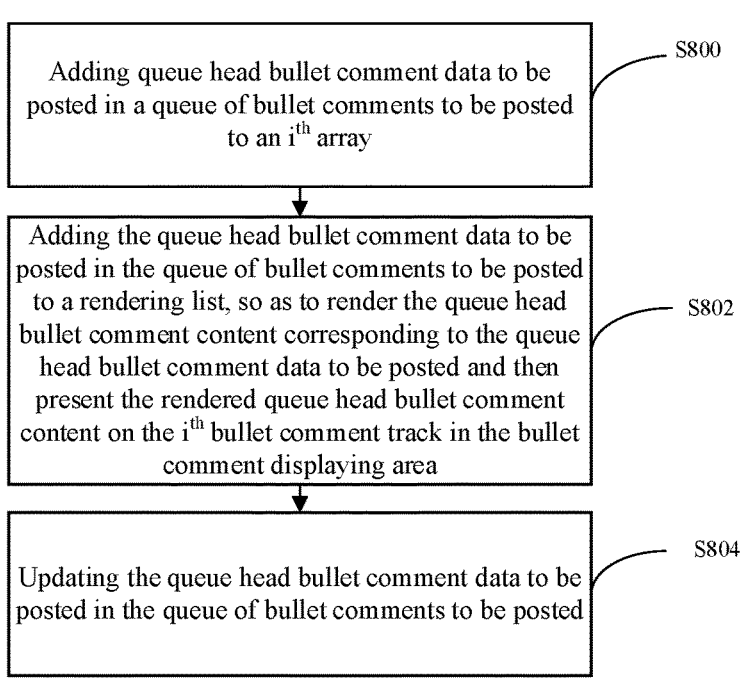
FIG. 8 is a flowchart schematically showing step S412 in FIG. 4.

If the current state of the $i^{th}$ bullet comment track is the idle state, as shown in FIG. 8, step S412 may include steps S800 to S804, where: In step S800, the queue head bullet comment data to be posted in the queue of bullet comments to be posted is added to the $i^{th}$ array. In step S802, the queue head bullet comment data to be posted in the queue of bullet comments to be posted is added to the rendering list, so as to render the queue head bullet comment content corresponding to the queue head bullet comment data to be posted and then present the rendered queue head bullet comment content on the $i^{th}$ bullet comment track in the bullet comment displaying area. In step S804, the queue head bullet comment data to be posted in the queue of bullet comments to be posted is updated.

For example, the queue of bullet comments to be posted includes target bullet comment data A1, target bullet comment data A2, target bullet comment data A3, . . . arranged sequentially from the queue head to the queue tail, and the queue head bullet comment data to be posted in the queue of bullet comments to be posted is currently the target bullet comment data A1.

① A current state of the first bullet comment track is determined by using the first sub array.

② When the current state of the first bullet comment track is the idle state, the target bullet comment data A1 is separately added backwards to the rendering list and the first subarray, and the target bullet comment data A1 is deleted from the bullet comment data to be posted, so as to update target bullet comment data (that is, the target bullet comment data A2) subsequent to the target bullet comment data A1 to the queue head bullet comment data to be posted in the queue of bullet comments to be posted. Bullet comment content in the target bullet comment data A1 in the rendering list may be subjected to the following operation: updating and rendering a style of a motion animation, etc. The target bullet comment data A2 in the first subarray is used to indicate that bullet comment content of the target bullet comment data 2 currently exists in the first bullet comment track.

③ Then the current state of the second bullet comment track is determined by using the second subarray.

④ When the current state of the second bullet comment track is the idle state, the target bullet comment data A2 is separately pushed backwards to the rendering list and the second subarray, and the target bullet comment data A2 is deleted from the bullet comment data to be posted, so as to update target bullet comment data (that is, the target bullet comment data A3) subsequent to the target bullet comment data A2 to the queue head bullet comment data to be posted in the queue of bullet comments to be posted.

⑤ Then a current state of the third bullet comment track is determined by using the third sub array.

⑥ When the current state of the third bullet comment track is the crowded state, a current state of the fourth bullet comment track is directly determined by using the fourth subarray.

By analogy, repeating is not performed herein.

In addition, after being added to the rendering list and the $i^{th}$ subarray, the target bullet comment data at the head of the queue of bullet comments to be posted may be deleted, so as to update subsequent target bullet comment data (for example, subsequent target bullet comment data whose position is second only to the target bullet comment data) of the target bullet comment data to the queue head bullet comment data to be posted in the queue of bullet comments to be posted, and the target bullet comment data may be deleted from the queue of bullet comments to be posted.

Example 2

If all bullet comment tracks are in the crowded state, it is considered that the current number of bullet comments is too large and exceeds a rendering capacity of a screen, and therefore, at least one piece of target bullet comment data in the queue of bullet comments to be posted may be deleted.

① A current state of the first bullet comment track is determined by using the first sub array.

② When the current state of the first bullet comment track is the crowded state, a current state of the second bullet comment track is directly determined by using the second subarray.

③ When the current state of the second bullet comment track is the crowded state, a current state of the third bullet comment track is directly determined by using the third subarray.

By analogy, if all the bullet comment tracks (M tracks) are in the crowded state, the plurality of pieces of target bullet comment data in the queue of bullet comments to be posted are deleted.

Figure 9:
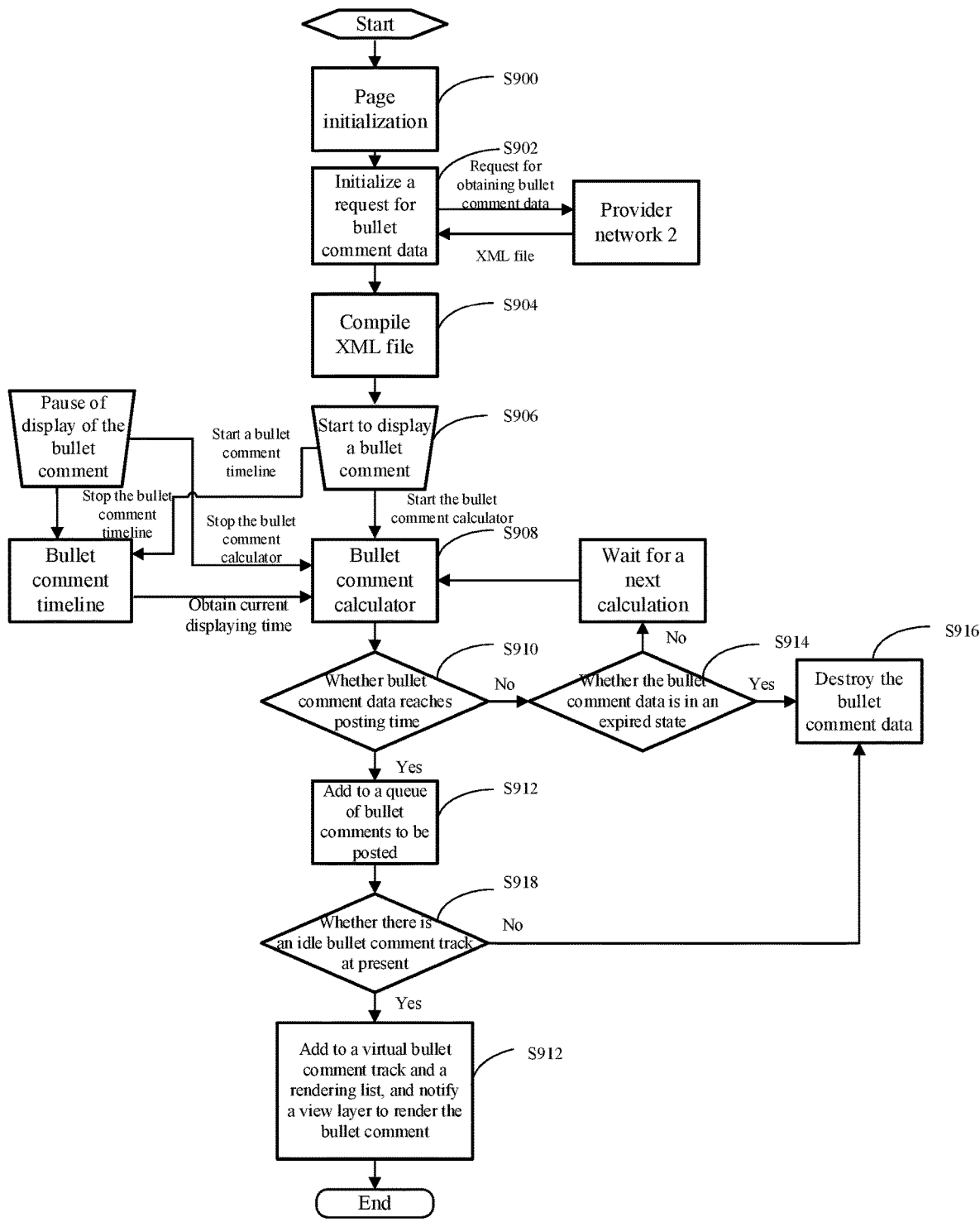
FIG. 9 is another flowchart schematically showing the bullet comment presentation method according to Embodiment 2 of the present application.

As shown in FIG. 9, the following provides a specific example for better understanding. It should be noted that this example is not used to limit the protection scope of the patent.

In step S900, an initialization operation is performed on a WeChat mini program page.

In step S902, a request for original bullet comment data is initiated.

After the WeChat mini program page is initialized, a bullet comment loader initiates the request for the original bullet comment data to a provider network 2, and receives an Extensible Markup Language (XML) file returned by the provider network 2.

The bullet comment loader is located at a logical layer of the WeChat mini program page. The logical layer also includes a bullet comment calculator and a bullet comment timeline.

In step S904, the XML file is compiled to obtain a plurality of pieces of original bullet comment data.

Specifically, the XML file is compiled into an Element object, a plurality of pieces of original bullet comment data, for example, attributes (original bullet comment data) such as bullet comment content, posting time, a bullet comment color, and moving time are obtained from the Element object, and these attributes are converted into a json data format and stored in a local array, to obtain a plurality of pieces of original bullet comment data stored in the local array. Then, the plurality of pieces of original bullet comment data are cloned to obtain the plurality of pieces of bullet comment data. Reasons are as follows:

In the process of screening and using the bullet comment, a state of the bullet comment may change. When a playing progress bar is dragged back to a previous playing time node, the bullet comment data may no longer be usable due to the change of the state, and consequently it is often required to request downloading again from the provider network 2.

In this embodiment, the obtained plurality of pieces of original bullet comment data are located in the original data and are not used for a bullet comment display operation. The implementations are as follows: the plurality of pieces of original bullet comment data are cloned to obtain a plurality of pieces of bullet comment data corresponding to the first cloning operation, the plurality of pieces of bullet comment data corresponding to the first cloning operation are used for a bullet comment display operation; and when a playing progress bar is dragged back to a previous playing time node, the plurality of pieces of original bullet comment data as the original data are cloned to obtain a plurality of pieces of bullet comment data corresponding to the second cloning operation, and the plurality of pieces of bullet comment data corresponding to the second cloning operation are used for a bullet comment display operation. It is not difficult to understand that, in this embodiment, each time the playing progress bar is dragged back to the previous playing time node, a cloning operation can be performed again instead of requesting downloading again from the provider network 2.

The plurality of pieces of bullet comment data are used for subsequent bullet comment display operations.

In step S906, the bullet comment starts to be displayed.

The bullet comment calculator is used for bullet comment screening and calculation. The bullet comment timeline is used to manage the bullet comment timeline, that is, synchronizing current playing time of video streams.

The bullet comment calculator and bullet comment timeline are located at a logical layer of the application program 12 (such as a browser and a WeChat mini program), and the bullet comment timeline and the bullet comment calculator may work concurrently in a recursively called frame rendering mode through the logical layer.

When the bullet comment calculator detects that posting of the plurality of pieces of bullet comment data is completed, the bullet comment calculator and the bullet comment timeline stop running and a bullet comment system is reset. In addition, if the computer device 10 detects that a user clicks a pause button or video playing is completed, the bullet comment calculator and the bullet comment timeline may pause or stop running at the same time.

In step S908, each piece of bullet comment data is traversed by the bullet comment calculator to perform calculation and screening, to determine whether each piece of bullet comment data is in a to-be-posted state or in an expired state.

The following takes one piece of bullet comment data j therein as an example:

In step S910, whether the bullet comment data j reaches posting time is determined. If the bullet comment data j reaches the posting time, the process proceeds to step S912, otherwise, the process proceeds to step S914.

According to current playing time of a video stream and the posting time in the bullet comment data j, whether bullet comment content in the bullet comment data j reaches the posting time is determined, that is, whether the bullet comment data j is in the to-be-posted state at present is determined.

In step S912, the bullet comment data j is added to the queue of bullet comments to be posted, and the view layer is notified to perform a data update operation to perform the first rendering operation. The process proceeds to step S918:

The view layer is notified to perform the data update operation, and perform the first rendering operation according to the bullet comment data j in the to-be-posted state.

For example, real bullet comment elements are inserted outside a view area, which is invisible to a user, and no motion effects are added. Such an operation aims at obtaining a real bullet comment width of the bullet comment element so as to calculate a start motion position and an end motion position of the bullet comment content, and to be used as one of bases for determining whether there is a bullet comment track in an idle state in a plurality of bullet comment tracks.

The bullet comment data j added to the queue of bullet comments to be posted may be deleted from the plurality of pieces of bullet comment data to reduce the number of subsequent traversals.

In step S914, whether the bullet comment data j is in the expired state is determined. If the bullet comment data j is in the expired state, the process proceeds to step S916, otherwise, the bullet comment data j waits for the next traversal operation.

In step S916, the bullet comment data j is destroyed. For example, the bullet comment data j is deleted from the plurality of pieces of bullet comment data to reduce the number of subsequent traversals.

In step S918, whether there is an idle bullet comment track at present is determined. If there is an idle bullet comment track, the process proceeds to step S920, otherwise, the process proceeds to step S916.

Exemplarily, a bullet comment width of a bullet comment element obtained after the first rendering operation is obtained. Whether the plurality of bullet comment tracks include a bullet comment track in the idle state is determined according to the bullet comment width of the bullet comment element.

① Whether the $i^{th}$ subarray is empty is determined, the $i^{th}$ subarray corresponding to the $i^{th}$ bullet comment track.

② It is determined, if the $i^{th}$ subarray is empty, that a current state of the $i^{th}$ bullet comment track is an idle state.

③ If the $i^{th}$ subarray is not empty, it is assumed that posting time and moving time of the last piece of bullet comment content in the $i^{th}$ bullet comment track are $t_1$ and $t_2$ respectively, then time when the last piece of bullet comment content completely disappears from the bullet comment displaying area (the view area) is $t_1+t_2$, and it is assumed that the posting time, the moving time, and the bullet comment width of the bullet comment data j and the displaying width of the bullet comment displaying area are $t_3$, $t_4$, $w_2$, and $w_1$ respectively, then a moving speed of the bullet comment data j is $s_1=(w_1+w_2)/t_4$. Therefore, it may be concluded that time when the bullet comment content in the bullet comment data j reaches the left boundary of the bullet comment displaying area for the first time is $t_3+(w_1/s_1)$. When $t_1+t_2<t_3+(w_1/s_1)$, it indicates that when the last piece of bullet comment content completely disappears from the bullet comment displaying area, the bullet comment content in the bullet comment data j still has not caught up with the last piece of bullet comment content. This means that the last piece of bullet comment content and the bullet comment content in the bullet comment data j will not collide, and therefore, it may be determined that a current state of the $i^{th}$ bullet comment track is the idle state.

In step S920, a virtual bullet comment track and a rendering list are added, and the view layer is notified to perform a data update operation to perform the second rendering operation.

① The bullet comment data j in the queue of bullet comments to be posted is added to the virtual bullet comment track. The virtual bullet comment track is used for determining whether each bullet comment track is in the idle state.

② The bullet comment data j in the queue of bullet comments to be posted is added to the rendering list to further create a corresponding bullet comment element, such as moving effects.

Embodiment 3

Figure 10:
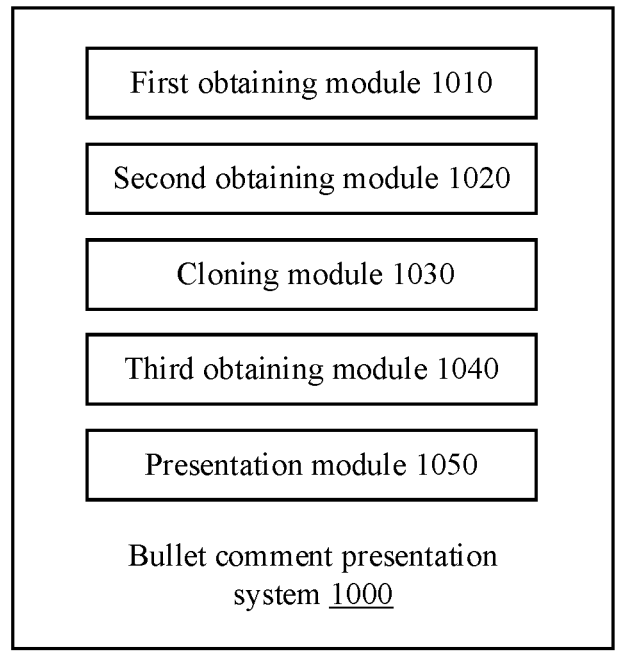
FIG. 10 is a block diagram schematically showing a communication system according to Embodiment 3 of the present application.

FIG. 10 is a block diagram schematically showing a bullet comment presentation system according to Embodiment 3 of the present application. The bullet comment presentation system may be divided into one or more program modules, and the one or more program modules are stored in a storage medium and executed by one or more processors to implement the embodiments of the present application. The program modules referred to in the embodiments of the present application refer to a series of computer-readable instruction segments that can complete a specific function. The functions of various program modules in the embodiments will be specifically described in the following descriptions.

As shown in FIG. 10, the bullet comment presentation system 1000 may include a first obtaining module 810, a second obtaining module 1020, a cloning module 1030, a third obtaining module 1040, and a presentation module 1050, where:

The first obtaining module 1010 is configured to obtain a video playing page.

The second obtaining module 1020 is configured to obtain a plurality of pieces of original bullet comment data, each piece of original bullet comment data including a bullet comment content and bullet comment posting time.

The cloning module 1030 is configured to clone the plurality of pieces of original bullet comment data to obtain a plurality of pieces of bullet comment data.

The third obtaining module 1040 is configured to obtain a plurality of pieces of target bullet comment data from the plurality of pieces of bullet comment data according to bullet comment posting time of each piece of bullet comment data.

The presentation module 1050 is configured to present at least one piece of bullet comment content in the plurality of pieces of target bullet comment data in a bullet comment displaying area of the video playing page.

In an exemplary embodiment, the third obtaining module 1040 is further configured to: obtain an amount of bullet comment data matching current time on a bullet comment timeline through traversing the plurality of pieces of bullet comment data by a bullet comment calculator; and determine the amount of bullet comment data as the plurality of pieces of target bullet comment data.

In an exemplary embodiment, the bullet comment timeline and the bullet comment calculator work concurrently in a recursively called frame rendering mode.

In an exemplary embodiment, the bullet comment displaying area includes a plurality of bullet comment tracks. The presentation module 1050 is further configured to: add the plurality of pieces of target bullet comment data to a queue of bullet comments to be posted; and determine a current state of each bullet comment track according to a virtual bullet comment track, the virtual bullet comment track being a pre-configured nested array, the nested array including a plurality of subarrays, and each subarray being mapped to one of the plurality of bullet comment tracks; and determine, according to the current state of each bullet comment track, whether to post at least one piece of target bullet comment data in the queue of bullet comments to be posted to present at least one piece of bullet comment content in the at least one piece of target bullet comment data in the bullet comment displaying area.

In an exemplary embodiment, the presentation module 1050 is further configured to: S1: determine whether an $i^{th}$ subarray is empty, the $i^{th}$ subarray corresponding to an $i^{th}$ bullet comment track; and S2: determine, if the $i^{th}$ subarray is empty, that a current state of the $i^{th}$ bullet comment track is an idle state.

In an exemplary embodiment, the presentation module 1050 is further configured to: S3: determine, if the $i^{th}$ subarray is not empty, whether queue head bullet comment content in queue head bullet comment data to be posted in the queue of bullet comments to be posted and tail bullet comment content in the posted tail bullet comment data may collide, the queue head bullet comment data to be posted being target bullet comment data located at the head of the queue of bullet comments to be posted and the posted tail bullet comment data being posted bullet comment data located at the tail of the $i^{th}$ array; and S4: determine, if the queue head bullet comment content in the queue head bullet comment data to be posted and the tail bullet comment content in the posted tail bullet comment data may not collide, that the current state of the $i^{th}$ bullet comment track is the idle state.

In an exemplary embodiment, the determining whether queue head bullet comment content in queue head bullet comment data to be posted in the queue of bullet comments to be posted and tail bullet comment content in the posted tail bullet comment data may collide includes: calculating presentation time $t_1+t_2$ of the tail bullet comment content in the posted tail bullet comment data in the bullet comment displaying area according to posting time $t_1$ and moving time $t_2$ in the posted tail bullet comment data; calculating arrival time $t_3+[w_1*t_4/[w_1+w_2]]$ when the queue head bullet comment content in the queue head bullet comment data to be posted reaches a left boundary of the bullet comment displaying area according to posting time $t_3$, moving time $t_4$, and a bullet comment width $w_2$ in the queue head bullet comment data to be posted, and a displaying width $w_1$ of the bullet comment displaying area; determining whether the presentation time $t_1+t_2$ is earlier than the arrival time $t_3+[w_1*t_4/[w_1+w_2]]$; and determining, if the presentation time $t_1+t_2$ is earlier than the arrival time $t_3+[w_1*t_4/[w_1+w_2]]$, that the queue head bullet comment content in the queue head bullet comment data to be posted and the tail bullet comment content in the posted tail bullet comment data may not collide; and determining, if the presentation time $t_1+t_2$ is not earlier than the arrival time $t_3+[w_1*t_4/[w_1+w_2]]$, that the queue head bullet comment content in the queue head bullet comment data to be posted and the tail bullet comment content in the posted tail bullet comment data may collide.

In an exemplary embodiment, the presentation module 1050 is further configured to: S5: determine, if the queue head bullet comment content in the queue head bullet comment data to be posted and the tail bullet comment content in the posted tail bullet comment data may collide, that the current state of the $i^{th}$ bullet comment track is a crowded state.

In an exemplary embodiment, the presentation module 1050 is further configured to: update a value of i, and execute steps S1 to S4 on the basis of the updated value of i until i is equal to M, where 1≤i≥M, an initial value of i is 1, and M represents the number of the plurality of bullet comment tracks.

In an exemplary embodiment, the presentation module 1050 is further configured to: delete the plurality of pieces of target bullet comment data in the queue of bullet comments to be posted if it is determined that the first track to an $M^{th}$ track are all in the crowded state.

In an exemplary embodiment, the presentation module 1050 is further configured to: if it is determined that the current state of the $i^{th}$ bullet comment track is the idle state: add the queue head bullet comment data to be posted in the queue of bullet comments to be posted to the $i^{th}$ array; add the queue head bullet comment data to be posted in the queue of bullet comments to be posted to the rendering list, so as to render the queue head bullet comment content corresponding to the queue head bullet comment data to be posted and then present the rendered queue head bullet comment content on the $i^{th}$ bullet comment track in the bullet comment displaying area; and update the queue head bullet comment data to be posted in the queue of bullet comments to be posted.

Embodiment 4

Figure 11:
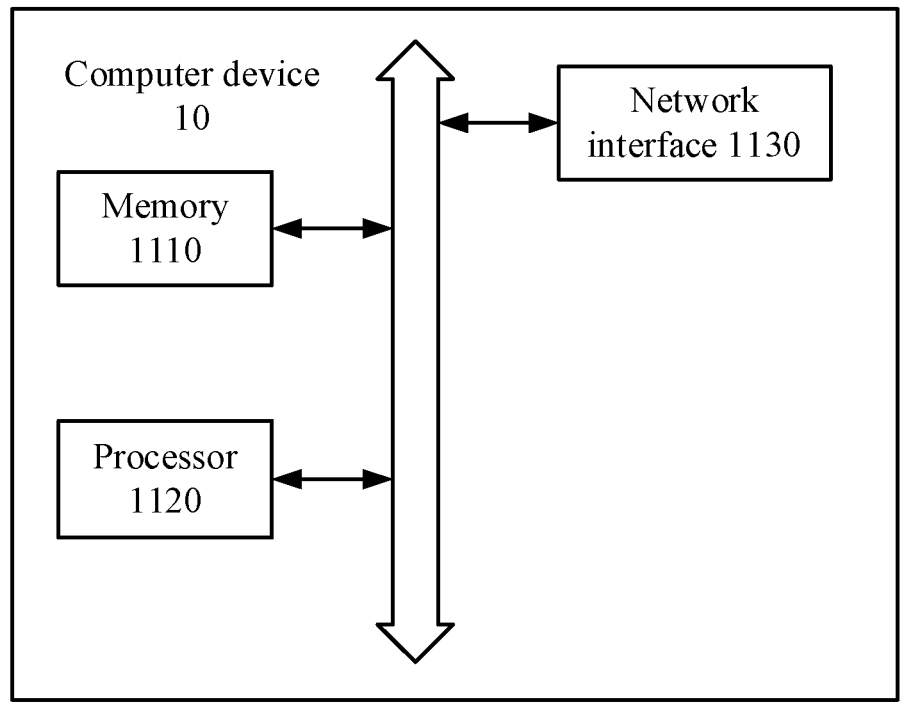
FIG. 11 is a schematic diagram schematically showing a hardware architecture of a computer device suitable for implementing a bullet comment presentation method according to Embodiment 4 of the present application.

FIG. 11 is a schematic diagram schematically showing a hardware architecture of a computer device suitable for implementing a bullet comment presentation method according to Embodiment 4 of the present application. In this embodiment, a computer device 10 is a device that may automatically perform numerical calculation and/or information processing according to preset or pre-stored instructions. The computer device 10 may be, for example, a smartphone, a computer, a projector, a set-top box, etc., or may be a virtual machine host process and one or more virtual machine instances, or a rack server, a blade server, a tower server, or a cabinet server (including an independent server or a server cluster composed of a plurality of servers), etc. As shown in FIG. 11, the computer device 10 at least includes, but is not limited to, a memory 1110, a processor 1120, and a network interface 1130, which may be communicatively connected to each other through a system bus, where:

The memory 1110 includes at least one type of computer-readable storage medium, and the readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the memory 1110 may be an internal storage module of the computer device 10, for example, a hard disk or a memory of the computer device 10. In some other embodiments, the memory 1110 may alternatively be an external storage device of the computer device 10, for example, a plug-in hard disk disposed on the computer device 10, a smart media card (SMC for short), a secure digital (SD for short) card, and a flash card. Certainly, the memory 1110 may alternatively include both the internal storage module of the computer device 10 and the external storage device thereof. In this embodiment, the memory 1110 is generally configured to store an operating system and various application software installed in the computer device 10, such as program codes for a bullet comment presentation method. In addition, the memory 1110 may be configured to temporarily store various types of data that has been output or will be output.

The processor 1120 may be, in some embodiments, a central processing unit (CPU for short), a controller, a microcontroller, a microprocessor, or other data processing chips. The processor 1120 is generally configured to control overall operation of the computer device 10, for example, executing control, processing, etc. related to data exchange or communication with the computer device 10. In this embodiment, the processor 1120 is configured to run program codes stored in the memory 1110 or process data.

The network interface 1130 may include a wireless network interface or a wired network interface, and the network interface 1130 is generally configured to establish a communication connection between the computer device 10 and other computer devices. For example, the network interface 1130 is configured to connect the computer device 10 to an external terminal through a network, and establish a data transmission channel, a communication link, etc. between the computer device 10 and the external terminal. The network may be a wireless or wired network such as Intranet, Internet, the Global System of Mobile Communication (GSM for short), wideband code division multiple access (WCDMA for short), a 4G network, a 5G network, Bluetooth, or Wi-Fi.

It should be noted that FIG. 11 shows only a computer device with components 1010 to 1030, but it should be understood that not all of the illustrated components are required to be implemented, and more or fewer components may be implemented instead.

In this embodiment, the bullet comment presentation method stored in the memory 1110 may also be divided into one or more program modules and executed by one or more processors (by the processor 1120 in this embodiment) to implement the present application.

Embodiment 5

This embodiment further provides a computer-readable storage medium having stored thereon computer-readable instructions, where when the computer-readable instructions are executed by a processor, the following steps are implemented:

obtaining a video playing page;

obtaining a plurality of pieces of original bullet comment data, each piece of original bullet comment data including bullet comment content and bullet comment posting time;

cloning the plurality of pieces of original bullet comment data to obtain a plurality of pieces of bullet comment data;

obtaining a plurality of pieces of target bullet comment data from the plurality of pieces of bullet comment data according to bullet comment posting time of each piece of bullet comment data; and presenting at least one piece of bullet comment content in the plurality of pieces of target bullet comment data in a bullet comment displaying area of the video playing page.

In this embodiment, the computer-readable storage medium includes a flash memory, a hard disk, a multimedia card, a card-type memory (e.g., an SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, etc. In some embodiments, the computer-readable storage medium may be an internal storage unit of the computer device, for example, a hard disk or a memory of the computer device.

In some other embodiments, the computer-readable storage medium may alternatively be an external storage device of the computer device, for example, a plug-in hard disk disposed on the computer device, a smart media card (SMC for short), a secure digital (SD for short) card, and a flash card. Certainly, the computer-readable storage medium may alternatively include both the internal storage unit of the computer device and the external storage device thereof. In this embodiment, the computer-readable storage medium is generally configured to store an operating system and various application software installed in the computer device, such as program codes for a bullet comment presentation method in this embodiment. In addition, the computer-readable storage medium may be configured to temporarily store various types of data that has been output or will be output.

It will be apparent to those skilled in the art that the various modules or steps in the embodiments of the present application can be implemented by a general-purpose computing device that can be centralized on a single computing device or distributed across a network formed by a plurality of computing devices. Optionally, they may be implemented by program codes executable by the computing device, such that they may be stored in a storage device and executed by the computing device, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

The foregoing descriptions are merely illustrative of preferred embodiments of the present application, and are not intended to limit the patent scope of the present application. Any equivalent structure or equivalent process transformation made using the contents of the description and accompanying drawings of the present application, or any direct or indirect application thereof in other related technical fields shall equally fall within the patent protection scope of the present application.

What is claimed is:

1. A method of presenting bullet comments, comprising:

obtaining a page of playing a video;

obtaining a plurality of pieces of original bullet comment data, each piece of original bullet comment data comprising content of a bullet comment and timing information indicating a time of posting the bullet comment in the video;

cloning the plurality of pieces of original bullet comment data to obtain a plurality of pieces of bullet comment data corresponding to the plurality of pieces of original bullet comment data;

obtaining a plurality of pieces of target bullet comment data from the plurality of pieces of bullet comment data based on the timing information associated with each piece of original bullet comment data; and presenting content comprised in at least one of the plurality of pieces of target bullet comment data in an area of the page, the area configured to display bullet comments, wherein the area comprises a plurality of bullet comment tracks, and wherein the presenting content comprised in at least one of the plurality of pieces of target bullet comment data in an area of the page further comprises:

adding the plurality of pieces of target bullet comment data to a queue of bullet comments to be posted, determining a current state of each bullet comment track based on a virtual bullet comment track, the virtual bullet comment track being a pre-configured nested array, the nested array comprising a plurality of subarrays, each subarray being mapped to one of the plurality of bullet comment tracks, and determining, based on the current state of each bullet comment track, whether to post at least one piece of target bullet comment data in the queue of bullet comments so as to present the content comprised in the at least one of the plurality of pieces of target bullet comment data in the area.

2. The method according to claim 1, wherein the obtaining a plurality of pieces of target bullet comment data from the plurality of pieces of bullet comment data based on the timing information associated with each piece of original bullet comment data comprises:

obtaining a number of pieces of bullet comment data matching a current time of a bullet comment timeline by traversing the plurality of pieces of bullet comment data using a bullet comment calculator; and identifying the number of pieces of bullet comment data as the plurality of pieces of target bullet comment data.

3. The method according to claim 2, wherein the bullet comment timeline and the bullet comment calculator work concurrently in a recursively called frame rendering mode.

4. The method according to claim 1, wherein the determining a current state of each bullet comment track based on a virtual bullet comment track comprises:

S1: determining whether an $i^{th}$ subarray is empty, the $i^{th}$ subarray corresponding to an $i^{th}$ bullet comment track; and S2: determining that a current state of the $i^{th}$ bullet comment track is an idle state in response to determining that the $i^{th}$ subarray is empty.

5. The method according to claim 4, wherein the determining a current state of each bullet comment track based on a virtual bullet comment track further comprises:

S3: in response to determining that the $i^{th}$ subarray is not empty, determining whether content of a piece of queue head bullet comment data in the queue of bullet comments and content of a piece of posted tail bullet comment data collide, wherein the piece of queue head bullet comment data is a piece of target bullet comment data located at a head of the queue of bullet comments, and the piece of posted tail bullet comment data is a piece of posted bullet comment data located at a tail of the $i^{th}$ subarray; and S4: determining that the current state of the $i^{th}$ bullet comment track is the idle state in response to determining that the content of the piece of queue head bullet comment data and the content of the piece of posted tail bullet comment data do not collide.

6. The method according to claim 5, wherein the determining whether content of a piece of queue head bullet comment data in the queue of bullet comments and content of a piece of posted tail bullet comment data collide comprises:

determining a presentation time of presenting the content of the piece of posted tail bullet comment data in the area based on a posting time $t_1$ and a moving time $t_2$ associated with the piece of posted tail bullet comment data;

determining an arrival time $t_3+[w_1*t_4/w_1+w_2)]$ indicating that the content of the piece of queue head bullet comment data reaches a left boundary of the area based on a posting time $t_3$, a moving time $t_4$, a bullet comment width $w_2$ associated with piece of queue head bullet comment data, and a displaying width $w_1$ of the area;

determining whether the presentation time is earlier than the arrival time;

determining, in response to determining that the presentation time is earlier than the arrival time, that the content of the piece of queue head bullet comment data and the content of the piece of posted tail bullet comment data do not collide; and determining, in response to determining that the presentation time is not earlier than the arrival time, that the content of the piece of queue head bullet comment data and the content of the piece of posted tail bullet comment data collide.

7. The method according to claim 5, wherein the determining a current state of each bullet comment track based on a virtual bullet comment track further comprises:

determining, in response to determining that the content of the piece of queue head bullet comment data and the content of the piece of posted tail bullet comment data collide, that the current state of the $i^{th}$ bullet comment track is a crowded state.

8. The method according to claim 5, wherein the determining a current state of each bullet comment track based on a virtual bullet comment track further comprises:

updating a value of i, and executing operations S1 to S4 on the basis of the updated value of i until i is equal to M; and wherein $1 \leq i \leq M$, an initial value of i is 1, and M represents a number of the plurality of bullet comment tracks.

9. The method according to claim 1, wherein the determining, based on the current state of each bullet comment track, whether to post at least one piece of target bullet comment data in the queue of bullet comments so as to present the content comprised in the at least one of the plurality of pieces of target bullet comment data in the area comprises:

deleting the plurality of pieces of target bullet comment data in the queue of bullet comments in response to determining that all bullet comment tracks are in the crowded state.

10. The method according to claim 4, wherein the determining, based on the current state of each bullet comment track, whether to post at least one piece of target bullet comment data in the queue of bullet comments so as to present the content comprised in the at least one of the plurality of pieces of target bullet comment data in the area comprises: in response to determining that the current state of the $i^{th}$ bullet comment track is the idle state:

adding the piece of queue head bullet comment data to the $i^{th}$ subarray;

adding the piece of queue head bullet comment data to a rendering list so as to render the content of the piece of queue head bullet comment data and present the rendered content on the $i^{th}$ bullet comment track in the area; and updating the queue of bullet comments.

11. The method according to claim 6, wherein the presentation time of presenting the content of the piece of posted tail bullet comment data is determined based on $t_1+t_2$, wherein $t_1$ represents the posting time associated with the piece of posted tail bullet comment data, and wherein $t_2$ represents the moving time associated with the piece of posted tail bullet comment data; and wherein the arrival time indicating that the content of the piece of queue head bullet comment data reaches the left boundary of the area is determined based on $t_3+[w_1*t_4/w_1+w_2)]$, wherein $t_3$ represents the post time associated with the piece of queue head bullet comment data, wherein $t_4$ represents the moving time associated with the piece of queue head bullet comment data, wherein $w_2$ represents the bullet comment width associated with the piece of queue head bullet comment data, and wherein $w_1$ represents the displaying width of the area.

12. A computer device, comprising a memory, a processor, and computer-readable instructions stored on the memory and executable on the processor, wherein when executing the computer-readable instructions, the processor implements operations comprising:
    obtaining a page of playing a video;
    obtaining a plurality of pieces of original bullet comment data, each piece of original bullet comment data comprising content of a bullet comment and timing information indicating a time of posting the bullet comment in the video;
    cloning the plurality of pieces of original bullet comment data to obtain a plurality of pieces of bullet comment data corresponding to the plurality of pieces of original bullet comment data;
    obtaining a plurality of pieces of target bullet comment data from the plurality of pieces of bullet comment data based on the timing information associated with each piece of original bullet comment data; and
    presenting content comprised in at least one of the plurality of pieces of target bullet comment data in an area of the page, the area configured to display bullet comments, wherein the area comprises a plurality of bullet comment tracks, and wherein the presenting content comprised in at least one of the plurality of pieces of target bullet comment data in an area of the page further comprises:
    adding the plurality of pieces of target bullet comment data to a queue of bullet comments to be posted,
    determining a current state of each bullet comment track based on a virtual bullet comment track, the virtual bullet comment track being a pre-configured nested array, the nested array comprising a plurality of subarrays, each subarray being mapped to one of the plurality of bullet comment tracks, and
    determining, based on the current state of each bullet comment track, whether to post at least one piece of target bullet comment data in the queue of bullet comments so as to present the content comprised in the at least one of the plurality of pieces of target bullet comment data in the area.

13. The computer device according to claim 12, wherein the obtaining a plurality of pieces of target bullet comment data from the plurality of pieces of bullet comment data based on the timing information associated with each piece of original bullet comment data comprises:
    obtaining a number of pieces of bullet comment data matching a current time of a bullet comment timeline by traversing the plurality of pieces of bullet comment data using a bullet comment calculator; and
    identifying the number of pieces of bullet comment data as the plurality of pieces of target bullet comment data.

14. The computer device according to claim 13, wherein the bullet comment timeline and the bullet comment calculator work concurrently in a recursively called frame rendering mode.

15. The computer device according to claim 12, wherein the determining a current state of each bullet comment track based on a virtual bullet comment track comprises:
    S1: determining whether an $i^{th}$ subarray is empty, the $i^{th}$ subarray corresponding to an $i^{th}$ bullet comment track; and
    S2: determining that a current state of the $i^{th}$ bullet comment track is an idle state in response to determining that the $i^{th}$ subarray is empty.

16. The computer device according to claim 15, wherein the determining a current state of each bullet comment track based on a virtual bullet comment track further comprises:
    S3: in response to determining that the $i^{th}$ subarray is not empty, determining whether content of a piece of queue head bullet comment data in the queue of bullet comments and content of a piece of posted tail bullet comment data collide, wherein the piece of queue head bullet comment data is a piece of target bullet comment data located at a head of the queue of bullet comments, and the piece of posted tail bullet comment data is a piece of posted bullet comment data located at a tail of the $i^{th}$ subarray; and
    S4: determining that the current state of the $i^{th}$ bullet comment track is the idle state in response to determining that the content of the piece of queue head bullet comment data and the content of the piece of posted tail bullet comment data do not collide.

17. The computer device according to claim 16, wherein the determining whether content of a piece of queue head bullet comment data in the queue of bullet comments and content of a piece of posted tail bullet comment data collide comprises:
    determining a presentation time of presenting the content of the piece of posted tail bullet comment data in the area based on a posting time $t_1$ and a moving time $t_2$ associated with the piece of posted tail bullet comment data;
    determining an arrival time $t_3+[w_1*t_4/w_1+w_2)]$ indicating that the content of the piece of queue head bullet comment data reaches a left boundary of the area based on a posting time $t_3$, a moving time $t_4$, a bullet comment width $w_2$ associated with piece of queue head bullet comment data, and a displaying width $w_1$ of the area;
    determining whether the presentation time is earlier than the arrival time;
    determining, in response to determining that the presentation time is earlier than the arrival time, that the content of the piece of queue head bullet comment data and the content of the piece of posted tail bullet comment data do not collide; and
    determining, in response to determining that the presentation time is not earlier than the arrival time, that the content of the piece of queue head bullet comment data and the content of the piece of posted tail bullet comment data collide.

18. A non-transitory computer-readable storage medium having stored thereon computer-readable instructions, wherein the computer-readable instructions can be executed by at least one processor, so as to implement operations comprising:
    obtaining a page of playing a video;
    obtaining a plurality of pieces of original bullet comment data, each piece of original bullet comment data comprising content of a bullet comment and timing information indicating a time of posting the bullet comment in the video;

cloning the plurality of pieces of original bullet comment data to obtain a plurality of pieces of bullet comment data corresponding to the plurality of pieces of original bullet comment data;

obtaining a plurality of pieces of target bullet comment data from the plurality of pieces of bullet comment data based on the timing information associated with each piece of original bullet comment data; and presenting content comprised in at least one of the plurality of pieces of target bullet comment data in an area of the page, the area configured to display bullet comments, wherein the area comprises a plurality of bullet comment tracks, and wherein the presenting content comprised in at least one of the plurality of pieces of target bullet comment data in an area of the page further comprises:

adding the plurality of pieces of target bullet comment data to a queue of bullet comments to be posted, determining a current state of each bullet comment track based on a virtual bullet comment track, the virtual bullet comment track being a pre-configured nested array, the nested array comprising a plurality of subarrays, each subarray being mapped to one of the plurality of bullet comment tracks, and determining, based on the current state of each bullet comment track, whether to post at least one piece of target bullet comment data in the queue of bullet comments so as to present the content comprised in the at least one of the plurality of pieces of target bullet comment data in the area.

* * * * *